United States Patent [19]

Woodhouse

[11] Patent Number: 5,539,992
[45] Date of Patent: *Jul. 30, 1996

[54] FIXTURE FOR ALIGNMENT OF VACUUM NOZZLES ON SEMICONDUCTOR MANUFACTURING EQUIPMENT

[75] Inventor: Glenn P. Woodhouse, Boise, Id.

[73] Assignee: Micron Electronics, Inc, Nampa, Id.

[*] Notice: The term of this patent shall not extend beyond the expiration date of Pat. No. 5,433,013.

[21] Appl. No.: 421,707

[22] Filed: Apr. 12, 1995

Related U.S. Application Data

[63] Continuation of Ser. No. 126,824, Sep. 24, 1993, Pat. No. 5,433,013.

[51] Int. Cl.$^6$ .............................. G01B 5/252; B21C 51/00
[52] U.S. Cl. ................................. 33/533; 33/550; 33/555; 72/31.05
[58] Field of Search ............................. 33/533, 546, 549, 33/550, 555; 29/337; 72/31.04, 31.05

[56] References Cited

U.S. PATENT DOCUMENTS

| | | |
|---|---|---|
| 1,783,088 | 7/1929 | Hill . |
| 1,836,041 | 5/1930 | Rickets . |
| 1,840,237 | 5/1930 | Leighton . |
| 2,371,532 | 8/1941 | McDougal . |
| 4,251,922 | 2/1981 | Perlotto . |
| 4,623,410 | 11/1986 | Hillesheim et al. . |
| 4,679,330 | 7/1987 | Williams ................................. 33/550 |
| 5,253,499 | 10/1993 | Knipp et al. ........................... 72/34 |
| 5,301,436 | 4/1994 | Johnston ................................. 33/506 |

OTHER PUBLICATIONS

Woodworth Catalog Z–54, *Zero Spindle Inspection Fixtures*, 1956. No Month.

Primary Examiner—Thomas B. Will
Attorney, Agent, or Firm—Kevin D. Martin

[57] ABSTRACT

An apparatus for measuring and correcting the straightness of a hollow vacuum nozzle for semiconductor assembly equipment comprises a collet which can rotate over 360° and holds the nozzle. An indicator, such as a dial indicator, has a tip which conformally and continuously engages the nozzle so that as the collet and nozzle are rotated the indicator tip rides on the nozzle. Any horizontal movement of a bent nozzle is shown on the indicator. The bend in the nozzle can then be repaired and rechecked while the nozzle is installed in the collet.

19 Claims, 2 Drawing Sheets

FIXTURE FOR ALIGNMENT OF VACUUM NOZZLES ON SEMICONDUCTOR MANUFACTURING EQUIPMENT

This is a continuation of application Ser. No. 08/126,824, filed on Sep. 24, 1993, now U.S. Pat. No. 5,433,013.

FIELD OF THE INVENTION

The invention relates to the field of printed circuit assembly manufacturing, and more specifically to the repair of equipment used to assemble semiconductor devices onto printed circuit boards.

BACKGROUND OF THE INVENTION

To assemble components such as memory devices, logic devices, and other integrated circuits onto printed circuit boards, an automated process is commonly used. One link in the automated assembly process is a pick and place machine such as the IP-II manufactured by Fuji of Chiryn, Aichiken, Japan. The pick and place machine uses an X-Y positioning system and a motorized hollow vacuum nozzle to remove the memory device(s) or integrated circuit(s) from a tape and reel feeder, stick feeder, or waffle tray and place the devices on the printed circuit board in the correct X, Y, and rotational position. A properly functioning pick and place machine such as the Fuji described above can accurately place devices to a tolerance of ±0.004 inches.

One problem associated with the vacuum nozzle is that through use the nozzle can become bent which greatly decreases the placement accuracy of the machine. To fully calibrate the pick and place machine each nozzle must be properly aligned. On the Fuji IP-II there are eight nozzles. Bent nozzles are typically returned to the factory for reconditioning or replacement which requires a number of weeks and a high expense. There is a need for an apparatus which allows for a quick and economical repair of bent nozzles.

SUMMARY OF THE INVENTION

The apparatus described herein is used for measuring the bend or straightness of a hollow vacuum nozzle for semiconductor assembly equipment. The apparatus, in one embodiment, comprises a distance indicator and an indicator tip movably attached (adjacent) to the distance indicator. The indicator tip continuously and conformally engages the hollow vacuum nozzle. The apparatus further comprises a collet capable of rotating 360° for receiving the hollow vacuum nozzle. The apparatus is arranged such that as the collet and the nozzle are rotated the indicator tip rides on the nozzle and the indicator indicates the position of the indicator tip.

Objects and advantages will become apparent to those skilled in the art from the following detailed description read in conjunction with the appended claims and the drawings attached hereto.

Figure 1:
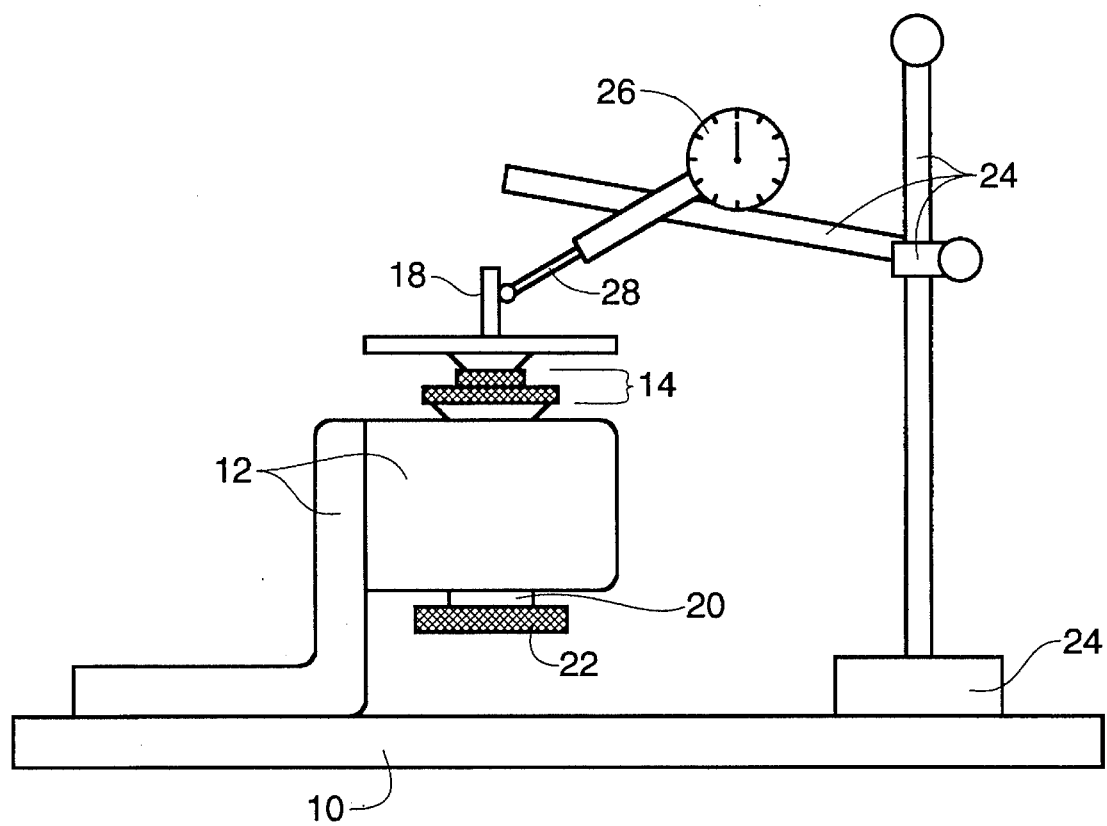
FIG. 1 is a side view of one embodiment of the apparatus.

It should be emphasized that the drawings herein are not necessarily to scale but are merely schematic representations. Specific structural details can be determined by one of skill in the art by examination of the drawing along with the information herein.

DETAILED DESCRIPTION OF THE INVENTION

FIG. 1 is a side view of one embodiment of the invention. In this embodiment, the various elements are positioned on a base 10. A first element comprises a bracket 12 mounted to the base 10. The bracket 12 receives an interchangeable collet 14, and the collet 14 receives a hollow nozzle 18. In the embodiment shown, the collet 14 is similar to the collet found on the Fuji IP-II pick and place, although other collets would function sufficiently due to the ability of the bracket to receive various collets. The IP-II requires two different types of nozzles so in this embodiment the apparatus has two interchangeable collets to receive them. The collet 14 is positioned on a set of bearings (not shown) and an axle 20 connects the collet 14 to a bottom wheel 22 through the bracket 12. The bottom wheel 22 facilitates rotation of the collet 14, for example by an equipment technician, and the collet is such that it can rotate the nozzle 360°. The collet 14 receives the hollow nozzle 18.

Also positioned on the base is a magnetic dial indicator stand 24 which receives a dial indicator 26 having, for example, a spring loaded indicator tip 28. The indicator tip 28 continuously and conformally engages the hollow vacuum nozzle 18 such that as the collet 14 and the nozzle 18 are rotated the indicator tip 28 rides on the nozzle 18 and the indicator 26 indicates the position of the tip 28.

A straight nozzle tested using the apparatus will rotate about its center point, and thus the indicator will remain on a single setting. A bent nozzle, however, will rotate about an axis away from its center point and thus the indicator will change with the rotation of the nozzle. In other words, a bent rotating nozzle moves the indicator tip horizontally and is measured by the indicator, while a straight rotating tip will have no horizontal movement. If the indicator shows that a nozzle is bent, a technician can manually straighten the nozzle, retest it, and provide further adjustment if necessary. A small rod was used to aid in straightening a bent nozzle. It was found that the nozzle was sufficiently straightened by placing a small rod into the end of the hollow vacuum nozzle and using the rod as a lever to straighten the nozzle. The fixture as shown in FIG. 1 provided sufficient support to allow the technician to straighten the nozzle while it was mounted in the fixture. With the invention as described above, a bend of as little as 0.001 inches was detected and repaired. As the maximum detectable bend depends on the length of the tip and the resolution of the indicator, the apparatus can be adjusted to allow for the maximum allowable bend.

Figure 2:
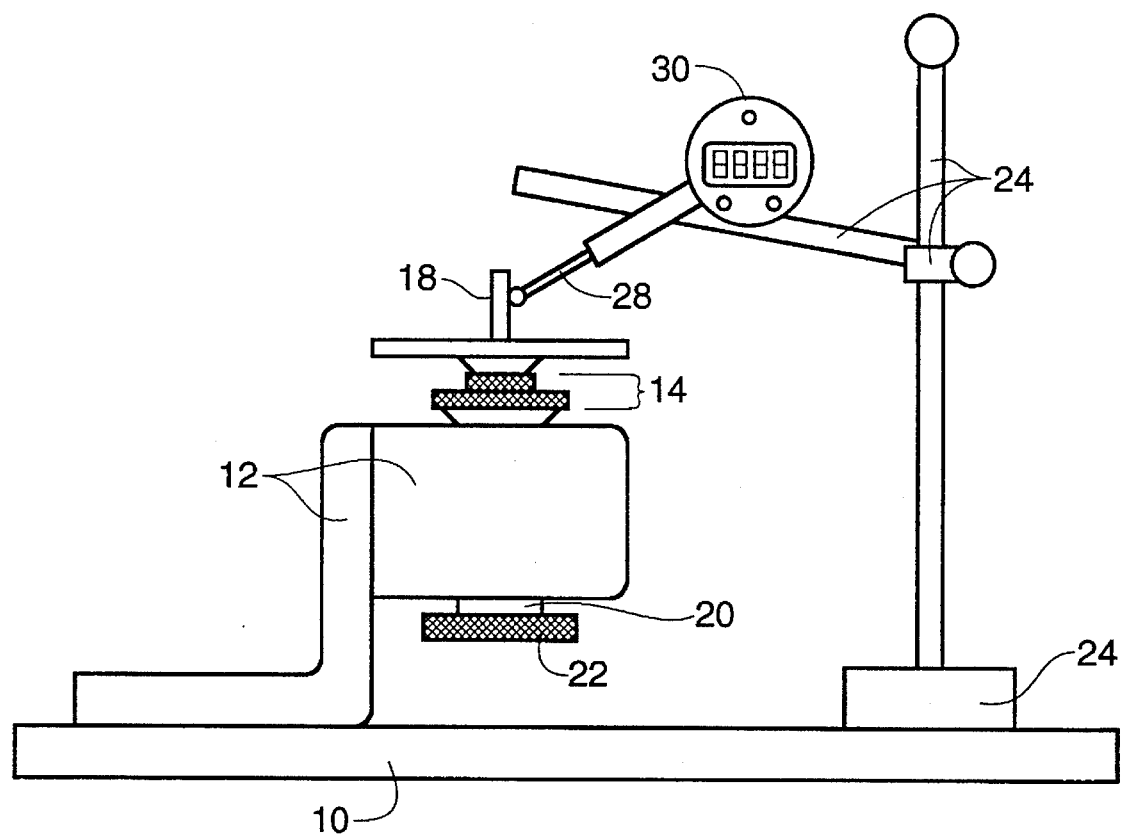
FIG. 2 is a side view of a second embodiment of the invention composing an electronic indicator.

The indicator used was a dial indicator manufactured by Teclock Corporation of Japan, model number LT-310, although many other indicators, mechanical 26 (as shown in FIG. 1) or electronical 30 (as shown in FIG. 2) would function sufficiently. The magnetic indicator stand was a model number 657 manufactured by Starrett of Athol, Mass. The collets for the nozzle were manufactured of steel by an in house machine shop. The bracket for the collet was manufactured of aluminum and the base was steel, and each was manufactured by an in-house machine shop.

While this invention has been described with reference to illustrative embodiments, this description is not meant to be construed in a limiting sense. Various modifications of the illustrative embodiments, as well as additional embodiments of the invention, will be apparent to persons skilled in the art upon reference to this description. For example, various embodiments of the invention can be used to repair other workpieces such as other types of nozzles, tubes or pipes. It is therefore contemplated that the appended claims will cover any such modifications or embodiments as fall within the true scope of the invention.

What is claimed is:

1. A method for straightening a tube, comprising the following steps:
    a) providing a distance indicator;
    b) providing a collet;
    c) placing a tube into said collet;
    d) providing an indicator tip which indicates a position of said tube;
    e) rotating said collet thereby rotating said tube, said indicator indicating a position of said tube;
    f) straightening said tube with a rod responsive to said indication, said collet supporting said tube during said straightening.

2. The method of claim 1, wherein said step of rotating said collet is repeated after said step of straightening said tube.

3. The method of claim 1 wherein during said step of rotating said collet, said indicator indicates horizontal movement of said tube.

4. The method of claim 1 further comprising the step of providing a bracket which positions said collet with respect to said indicator tip.

5. The method of claim 1 wherein said tube is a nozzle for semiconductor assembly equipment.

6. The method of claim 1 wherein said tube has a hollow portion therein, and said method further comprises the step of placing said rod into said hollow portion and straightening said tube responsive to said indication on said indicator.

7. A method for bending a workpiece, comprising the following steps:
    a) providing a distance indicator;
    b) providing a collet;
    c) placing a workpiece into said collet;
    d) moving said collet thereby moving said workpiece, such that said indicator indicates a position of said workpiece;
    e) bending said workpiece responsive to said indication of said workpiece position.

8. The method of claim 7 wherein said collet supports said workpiece during said bending.

9. The method of claim 7 wherein during said step of moving said collet, said indicator indicates horizontal movement of said workpiece.

10. The method of claim 7 further comprising placing a rod into a hollow end of said workpiece during said bending step.

11. The method of claim 7 further comprising the step of straightening said workpiece during said bending step.

12. The method of claim 7 wherein said workpiece is a nozzle for semiconductor assembly equipment.

13. The method of claim 7 wherein said collet is replaceable.

14. The method of claim 7, further comprising using a rod to aid in bending said workpiece responsive to said indication.

15. The method of claim 7 wherein said workpiece has a hollow portion therein, and said method further comprises the step of placing a rod into said hollow portion and straightening said workpiece during said bending step.

16. A method for straightening a bend of a hollow vacuum nozzle for semiconductor assembly equipment, comprising the following steps:
    a) providing a distance indicator;
    b) providing a rotatable collet;
    c) placing a hollow vacuum nozzle into said collet;
    d) providing an indicator tip movably attached to said distance indicator, said indicator tip engaging said hollow vacuum nozzle;
    e) rotating said collet and said nozzle, said tip riding on said nozzle such that said indicator tip indicates the position of said nozzle;
    f) placing a rod into an exposed end of said hollow vacuum nozzle and bending said hollow vacuum nozzle responsive to said indication on said indicator, said collet supporting said nozzle during said bending step.

17. The method of claim 16 wherein said collet is rotatable through 360°.

18. The method of claim 16 wherein said step of rotating said collet is repeated.

19. The method of claim 16 wherein during said step of rotating said collet and said nozzle, said collet is rotated which thereby rotates said nozzle.

* * * * *

UNITED STATES PATENT AND TRADEMARK OFFICE
CERTIFICATE OF CORRECTION

PATENT NO. : 5,539,992
DATED : July 30, 1996
INVENTOR(S) : Glenn P. Woodhouse

It is certified that error appears in the above-indentified patent and that said Letters Patent is hereby corrected as shown below:

Column 1, line 64, please replace "composing" with — comprising —.

Column 2, line 57, please replace "electronical" with — electronic —.

Column 3, line 43, after "collet", please insert — , — (a comma).

Signed and Sealed this

Seventeenth Day of December, 1996

Attest:

BRUCE LEHMAN

*Attesting Officer*  Commissioner of Patents and Trademarks